United States Patent
Chang et al.

(10) Patent No.: US 7,068,616 B2
(45) Date of Patent: Jun. 27, 2006

(54) MULTIPLE DYNAMIC CONNECTIVITY FOR SATELLITE COMMUNICATIONS SYSTEMS

(75) Inventors: Donald C. D. Chang, Thousand Oaks, CA (US); Wah L. Lim, Newport Beach, CA (US); Ming U. Chang, Rancho Palos Verdes, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 870 days.

(21) Appl. No.: 09/839,851

(22) Filed: Apr. 20, 2001

(65) Prior Publication Data

US 2002/0118654 A1    Aug. 29, 2002

Related U.S. Application Data

(60) Provisional application No. 60/266,685, filed on Feb. 5, 2001.

(51) Int. Cl.
    *H04B 7/185*    (2006.01)
(52) U.S. Cl. .................. 370/316; 370/474; 370/466
(58) Field of Classification Search ............... 370/315, 370/316, 338, 352, 401, 466, 474, 310, 319
    See application file for complete search history.

(56) References Cited

U.S. PATENT DOCUMENTS

| | | | |
|---|---|---|---|
| 4,085,368 A | 4/1978 | Yeh | |
| 4,500,883 A | 2/1985 | Gutleber | |
| 4,568,484 A | 2/1986 | Takayasu | |
| 4,631,499 A | 12/1986 | Kasperkovitz | |
| 4,727,503 A | 2/1988 | McWhirter | |
| 4,872,015 A | 10/1989 | Rosen | |
| 4,893,316 A | 1/1990 | Janc et al. | |
| 5,239,668 A | 8/1993 | Davis | |
| 5,398,034 A | 3/1995 | Spilker, Jr. | |
| 5,552,798 A | 9/1996 | Dietrich et al. | |
| 5,589,834 A | 12/1996 | Weinberg | |
| 5,629,707 A | 5/1997 | Heuvel et al. | |
| 5,633,872 A * | 5/1997 | Dinkins | 370/312 |
| 5,659,350 A | 8/1997 | Hendricks et al. | |
| 5,666,128 A | 9/1997 | Murray et al. | |
| 5,689,568 A | 11/1997 | Laborde | |
| 5,708,963 A | 1/1998 | Mobley et al. | |
| 5,715,516 A | 2/1998 | Howard | |
| 5,727,065 A | 3/1998 | Dillon | |

(Continued)

FOREIGN PATENT DOCUMENTS

EP        0682416       11/1995

(Continued)

OTHER PUBLICATIONS

U.S. Appl. No. 09/584,012, filed May 30, 2000, Chang.

*Primary Examiner*—Ajit Patel
(74) *Attorney, Agent, or Firm*—Georgann S. Grunebach

(57) ABSTRACT

A method and apparatus is disclosed for communicating between a user terminal and a communications network based on an Internet protocol via multiple dynamic wireless communications linkages. A user terminal includes a multiple beam antenna, a plurality of amplifiers coupled to the multiple beam antenna, a plurality of bandpass filters coupled to the plurality of amplifiers, a modem coupled to the plurality of bandpass filters, a router & hub coupled to the modem, a transport layer coupled to the router & hub, and an estimation processor coupled to the router & hub.

26 Claims, 5 Drawing Sheets

U.S. PATENT DOCUMENTS

| | | | | |
|---|---|---|---|---|
| 5,734,982 | A | 3/1998 | Endo et al. | |
| 5,740,164 | A | 4/1998 | Liron | |
| 5,751,971 | A | 5/1998 | Dobbins et al. | |
| 5,754,139 | A | 5/1998 | Turcotte et al. | |
| 5,757,767 | A * | 5/1998 | Zehavi | 370/208 |
| 5,760,741 | A | 6/1998 | Huynh et al. | |
| 5,760,819 | A | 6/1998 | Sklar et al. | |
| 5,801,751 | A | 9/1998 | Sklar et al. | |
| 5,805,067 | A | 9/1998 | Bradley et al. | |
| 5,844,636 | A | 12/1998 | Joseph et al. | |
| 5,852,721 | A | 12/1998 | Dillon et al. | |
| 5,856,804 | A | 1/1999 | Turcotte et al. | |
| 5,862,480 | A | 1/1999 | Wild | |
| 5,884,142 | A | 3/1999 | Wiedeman et al. | |
| 5,920,284 | A | 7/1999 | Victor | |
| 5,952,962 | A * | 9/1999 | Dybdal | 342/359 |
| 5,990,928 | A | 11/1999 | Sklar et al. | |
| 5,991,329 | A | 11/1999 | Lomp | |
| 5,995,062 | A | 11/1999 | Denney et al. | |
| 6,016,421 | A | 1/2000 | Weiss | |
| 6,041,233 | A * | 3/2000 | Rosati | 455/427 |
| 6,061,562 | A | 5/2000 | Martin et al. | |
| 6,084,541 | A | 7/2000 | Sayegh | |
| 6,084,864 | A | 7/2000 | Liron | |
| 6,088,571 | A | 7/2000 | Kane et al. | |
| 6,104,911 | A | 8/2000 | Diekelman | |
| 6,111,542 | A | 8/2000 | Day et al. | |
| 6,118,998 | A | 9/2000 | Wismer et al. | |
| 6,128,276 | A | 10/2000 | Agee | |
| 6,154,501 | A | 11/2000 | Friedman | |
| 6,167,237 | A | 12/2000 | Rapeli | |
| 6,167,286 | A | 12/2000 | Ward et al. | |
| 6,173,190 | B1 | 1/2001 | Usui | |
| 6,201,797 | B1 | 3/2001 | Leuca et al. | |
| 6,208,307 | B1 | 3/2001 | Frisco et al. | |
| 6,208,858 | B1 | 3/2001 | Antonio et al. | |
| 6,266,329 | B1 | 7/2001 | Lazaris-Brunner et al. | |
| 6,266,540 | B1 * | 7/2001 | Edgar et al. | 455/557 |
| 6,278,876 | B1 | 8/2001 | Joshi et al. | |
| 6,289,389 | B1 | 9/2001 | Kikinis | |
| 6,301,231 | B1 | 10/2001 | Hassan et al. | |
| 6,339,707 | B1 | 1/2002 | Wanfan et al. | |
| 6,353,643 | B1 | 3/2002 | Park | |
| 6,359,868 | B1 | 3/2002 | Chen et al. | |
| 6,366,761 | B1 | 4/2002 | Montpetit | |
| 6,411,607 | B1 * | 6/2002 | Robert et al. | 370/316 |
| 6,442,758 | B1 | 8/2002 | Jang et al. | |
| 6,445,777 | B1 | 9/2002 | Clark et al. | |
| 6,473,858 | B1 | 10/2002 | Shimomura et al. | |
| 6,484,213 | B1 | 11/2002 | Nouri | |
| 6,510,172 | B1 | 1/2003 | Miller | |
| 6,513,758 | B1 | 2/2003 | Lloyd | |
| 6,526,580 | B1 | 2/2003 | Shimomura et al. | |
| 6,529,706 | B1 | 3/2003 | Mitchell | |
| 6,556,845 | B1 | 4/2003 | Ide | |
| 6,560,292 | B1 | 5/2003 | Lundby | |
| 6,574,338 | B1 | 6/2003 | Sachdev | |
| 6,593,893 | B1 * | 7/2003 | Hou et al. | 343/786 |
| 6,628,919 | B1 | 9/2003 | Curello et al. | |
| 6,667,715 | B1 | 12/2003 | Chang | |
| 6,674,994 | B1 | 1/2004 | Fell et al. | |
| 6,704,543 | B1 | 3/2004 | Sharon et al. | |
| 6,708,029 | B1 * | 3/2004 | Wesel | 455/428 |
| 6,711,379 | B1 | 3/2004 | Owa et al. | |
| 6,751,801 | B1 | 6/2004 | Frisco et al. | |
| 6,768,906 | B1 | 7/2004 | Matthews et al. | |
| 6,775,251 | B1 * | 8/2004 | Wiedeman et al. | 370/316 |
| 6,810,413 | B1 | 10/2004 | Rajakarunanayake et al. | |
| 6,941,138 | B1 | 9/2005 | Chang et al. | |
| 6,963,548 | B1 | 11/2005 | Chang | |
| 2001/0003846 | A1 | 6/2001 | Rowe et al. | |
| 2001/0004604 | A1 | 6/2001 | Toshinitsu | |
| 2002/0072360 | A1 | 6/2002 | Chang et al. | |
| 2002/0072361 | A1 | 6/2002 | Knoblach et al. | |
| 2002/0072855 | A1 | 6/2002 | Fuchs et al. | |
| 2002/0128044 | A1 | 9/2002 | Chang | |
| 2002/0132643 | A1 | 9/2002 | Chang | |
| 2003/0207684 | A1 | 11/2003 | Wesel | |
| 2005/0099991 | A1 * | 5/2005 | Birdwell et al. | 370/349 |
| 2005/0232180 | A1 * | 10/2005 | Toporek et al. | 370/316 |
| 2006/0040614 | A1 * | 2/2006 | Chapelle et al. | 455/13.4 |

FOREIGN PATENT DOCUMENTS

| | | |
|---|---|---|
| EP | 1026778 | 1/2000 |
| EP | 1148662 | 10/2001 |
| EP | 1152552 | 11/2001 |

* cited by examiner

MULTIPLE DYNAMIC CONNECTIVITY FOR SATELLITE COMMUNICATIONS SYSTEMS

This application claims the benefit under 35 U.S.C. § 119(e) of U.S. provisional application No. 60/266,685 (PD-200277) filed on Feb. 5, 2001, entitled MULTIPLE LINK FIXED TERMINAL FOR GEOSTATIONARY COMMUNICATIONS USERS.

BACKGROUND OF THE INVENTION

The present invention relates generally to satellite communications systems. More specifically, but without limitation thereto, the present invention relates to an architecture for communicating between a user terminal and a communications network via multiple wireless communications links.

In a typical satellite communications system, a subscriber terminal transmits information to a hub via a satellite using a single forward radio frequency (RF) link and receives information from the hub via the satellite using a single RF return link. If either the forward link or the return link is interrupted between the satellite and the hub, the terminal is partially or totally disabled until another RF link can be established. Even if another link can be established quickly, the interruption in communications may severely impair the quality of service for applications such as digital television broadcasting. Another disadvantage of typical satellite communications systems is that the data rate is limited to the lowest data rate in the RF link, precluding many applications such as digital television. Even if higher data rates are available, they generally have a higher proportional cost compared to lower data rates.

SUMMARY OF THE INVENTION

The present invention provides a method and apparatus for communicating between a user terminal and a communications network based on an Internet protocol via multiple dynamic wireless communications linkages.

In one embodiment, the invention may be characterized as a method of data transfer for satellite communications systems that includes the steps of establishing multiple dynamic wireless linkages between a communications network based on an Internet protocol and a user terminal via a plurality of geo-stationary satellites and transferring datagrams conforming to the Internet protocol between the user terminal and the communications network over the multiple dynamic wireless linkages.

In another embodiment, the invention may be characterized as a user terminal for a satellite communications system that includes a multiple beam antenna for receiving and transmitting signals between the multiple link terminal and a plurality of geo-stationary satellites, a plurality of amplifiers coupled to the multiple beam antenna, a plurality of bandpass filters coupled to the plurality of amplifiers, a modem coupled to the plurality of bandpass filters, a router & hub coupled to the modem, a transport layer coupled to the router & hub, and an estimation processor coupled to the router & hub.

The aspects of the present invention become more apparent from the description, presented in conjunction with the following drawings.

BRIEF DESCRIPTION OF THE DRAWINGS

The above and other aspects, features and advantages of the present invention will be more apparent from the following more specific description thereof, presented in conjunction with the following drawings wherein.

Corresponding reference characters indicate corresponding components throughout the several views of the drawings.

DETAILED DESCRIPTION OF THE DRAWINGS

The following description is presented to disclose the currently known best mode for making and using the present invention. The scope of the invention is defined by the claims.

Figure 1:
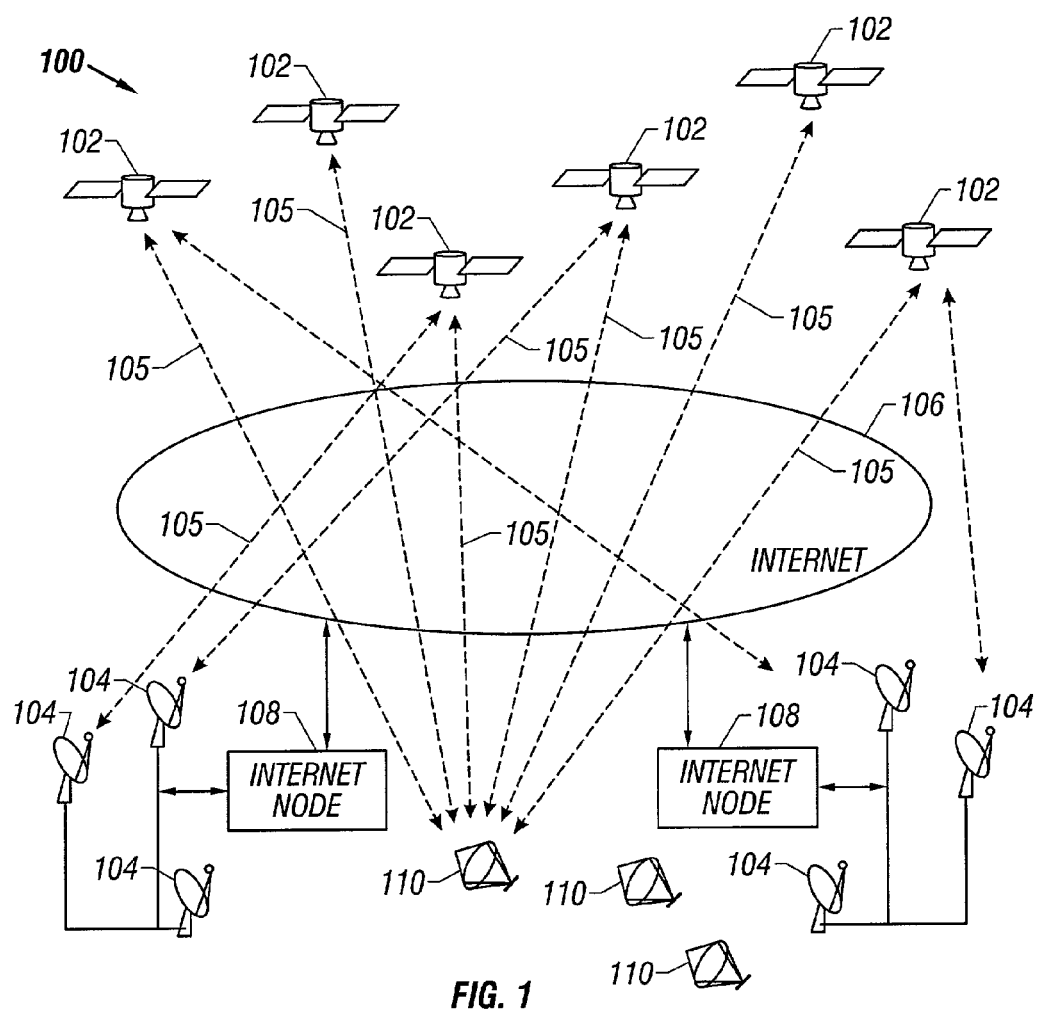
FIG. 1 is a diagram of a satellite communications system based on an Internet protocol according to an embodiment of the present invention.

FIG. 1 is a diagram of a satellite communications system 100 based on an Internet protocol according to an embodiment of the present invention. Shown in FIG. 1 are geostationary satellites 102, RF communications base terminals 104 linking Internet nodes 108 with the geostationary satellites 102, wireless dynamic linkages 105, an Internet 106, and user terminals 110.

The geo-stationary satellites 102 may be, for example, satellites used for digital television systems and for broadband systems such as Spaceway. The geostationary satellites 102 may also be transponder platforms such as those used for stratospheric platform based broadband systems. Other types of stationary platforms, such as ground-based stations, may be used as geo-stationary satellites 102 to suit specific applications. In the example of the satellite communications system 100, there are six geo-stationary satellites 102 within the field of view of each of the user terminals 110.

The dashed lines in FIG. 1 indicate exemplary radio frequency (RF) wireless communications linkages 105 in the satellite communications system 100. The wireless communications linkaqes 105 connect the Internet nodes 108 to each of the user terminals 110 via multiple geostationary satellites 102. The wireless communications linkages 105 may be, for example, forward and return radio frequency (RF) links established in the same manner and with similar equipment used for cellular telephone systems. The actual number and configuration of the radio frequency (RF) wireless communications linkages 105 between the user terminals 110 and the geo-stationary satellites 102 may change according to traffic conditions and available resources in the geo-stationary satellites 102. The wireless communications linkage 105 in the satellite communication system 100 may therefore be characterized as dynamic.

The RF communications base terminals 104 transmit and receive signals between the Internet nodes 108 and the geo-stationary satellites 102 over the wireless communications linkages 105. The RF communications base terminals 104 may be similar to the equipment used in a base station to establish RF links with users in cellular telephone systems.

One or more Internet nodes 108 may be connected to the geo-stationary satellites 102. Each of the Internet nodes 108 may be, for example, a hub through which users are connected to the Internet. In this case, the geo-stationary satellites 102 provide last mile connectivity to the user terminals 110. The Internet nodes 108 may each be conveniently located anywhere within the field of view of the corresponding geo-stationary satellite 102.

The Internet 106 contains many interconnected networks that are based on a data packet transport mechanism. Consecutive data packets generated from an information source, either from a client computer or from a network server, may travel to a designated user terminal 110 via very different paths. The number of routers and servers involved in data packet delivery may change dynamically. The number of clients competing for the connectivity resource over a hub may vary over time, however a user terminal 110 equipped with a multiple beam antenna (MBA) may continuously provide multiple paths connected to various nodes of the Internet 106. Applications running on the user terminals 110 can therefore communicate concurrently with the Internet 106 using these multiple paths.

The combination of the multiple beam capability of the user terminals 110 and the data packet transport characteristics via multiple routes in the Internet 106 ensures uninterrupted communications between the user terminals 110 and information sources within the Internet 106.

User terminals 110 are connected to the Internet 106 via geo-stationary satellites 102 and the RF communications base terminals 104. The connection of the wireless communications linkages 105 may change dynamically, depending on the traffic load and other conditions. The multiple links of the wireless communications linkages 105 provide graceful degradation. For example, in a single fixed physical connection, data transfer is completely interrupted if the physical connection is broken. Often data is lost as well as time in the process of re-establishing the connection. In the present invention, however, data packets may be transferred by several wireless communications linkages 105 concurrently. If one connection is broken, only a small number of the data packets are lost that require retransmission. The retransmission is usually authorized by a higher layer protocol and is performed automatically through other available links. An important feature of packet switched connectivity is that dedicated circuitry is not needed to provide continuous connectivity between geo-stationary satellites 102 and user terminals 110. A real connection is established only when a data packet is to be delivered; virtual connectivity is always present. By advantageously exploiting the inherent packet switching architecture of the Internet, the real connectivity resource of geo-stationary satellites 102 may be shared more effectively among more user terminals 110.

The bandwidth of the wireless communications linkages 105 may also be dynamic. Each of the RF communications base terminals 104 may have several data rates, and the data rates may differ among the RF communications base terminals 104, so that the bandwidth required by a user terminal 110 is always available. A single RF communications base terminal 104 may provide only a small portion of the total data throughput when the quality of a wireless communications linkage 105 drops, or the RF communications base terminal 104 may provide a significant portion of the data throughput when the quality of the wireless communications linkage 105 rises. User terminals 110 operate independently from the availability of any single wireless communications linkage 105, rather from a combination of multiple wireless communications linkages 105 operating in parallel concurrently. The multiple wireless communications linkages 105 deliver data packets between the multiple link user terminal 110 and an information source (data server) or sink (client) in the Internet 106.

The Internet 106 may be, for example, the global Internet or any other communications network based on an Internet protocol. Well known Internet protocol allows currently available routers to be used in the multiple link user terminals 110 for both the transmit and receive modes. The Internet infrastructure inherently accommodates data packets or frames arriving by different routes at different times, and Internet protocol ensures that the data packets are re-arranged at the destination in the proper sequence and are presented in the right format for each specific application.

Figure 2:
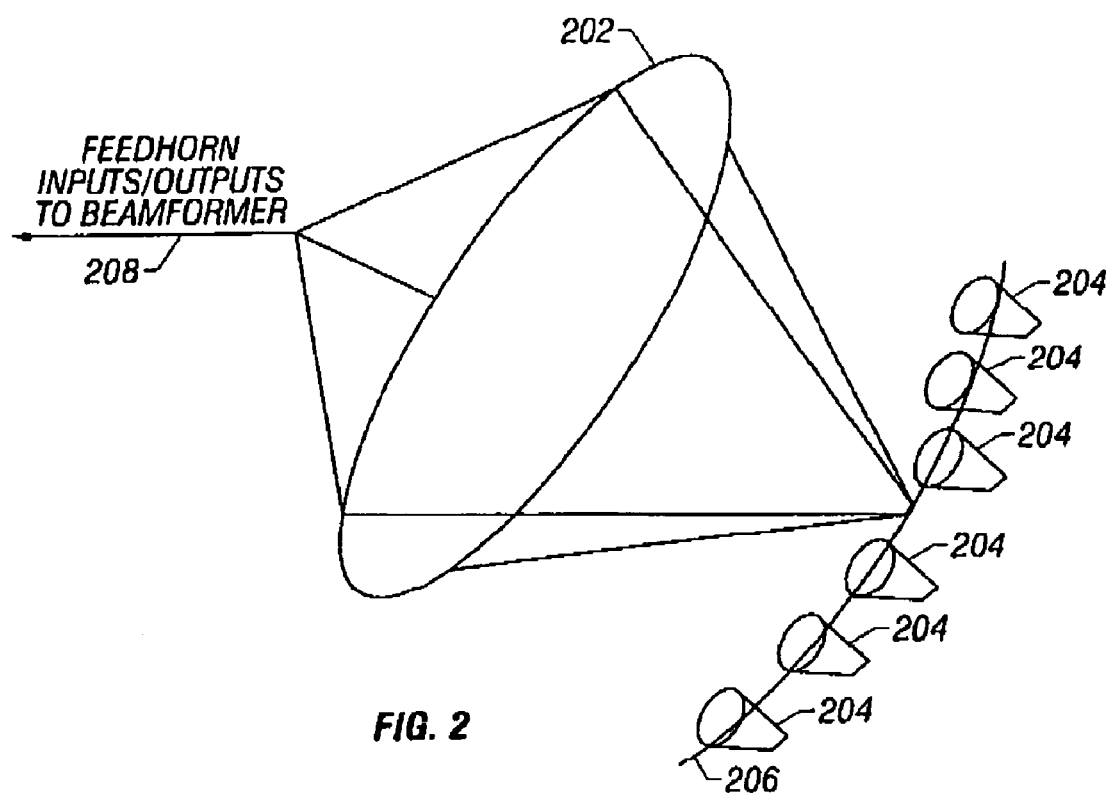
FIG. 2 is a diagram of a multiple beam antenna (MBA) 200 that may be used for transmitting and receiving data frames between the satellites and each of the user terminals in FIG. 1.

FIG. 2 is a diagram of a multiple beam antenna (MBA) 200 that may be used for transmitting and receiving data frames between the geo-stationary satellites 102 and each of the user terminals 110 in FIG. 1. Shown in FIG. 2 are a parabolic reflector 202, feedhorns 204, and a tracking mechanism 206.

The multiple beam antenna (MBA) 200 provides simple operation at low cost and high performance, however other multiple beam antennas may be used with the user terminal 110 according to techniques well known in the art to suit specific applications. The description of the multiple beam antenna (MBA) 200 below applies to the receive mode and may be applied reciprocally to the transmit mode. The construction of the multiple beam antenna (MBA) 200 includes the parabolic reflector 202 with a generally one-dimensional array of feedhorns 204. The multiple beam antenna 200 is oriented so that the array of feedhorns 204 are illuminated by the geo-stationary satellites 102 along the geo-stationary arc. Using the Ku band, for example, an aperture of about 1.5 meters is adequate for the parabolic reflector 202 to ensure that the beamwidth of illumination is about 1 degree and that the field of view of the multiple beam antenna 200 is about 15 degrees to 20 degrees. The parabolic reflector 202 allows the illuminating beam to scan to about 10 beamwidths in both directions of the geo-stationary arc. Other techniques may be used to enlarge the field of view if desired according to techniques well known in the art.

Each of the feedhorns 204 is positioned in the focal plane of the parabolic reflector 202 corresponding to a beam direction pointed at one of, for example, six pre-selected satellite slots of the geo-stationary satellites 102. The dimensions of the feedhorns 204 and the focal distance of the parabolic reflector 202 are designed to optimize scan loss. Scan loss is defined as the maximum gain loss of a pencil beam scanned from the boresight of the parabolic reflector 202. Boresight is the beam pointing direction of an illuminating feedhorn 204 located at the focus of the parabolic reflector 202. In general, the aperture of each of the feedhorns 204 is in the order of one wavelength. The expected peak gain of a beam is about 45 dB at boresight and about 42 dB at 10 degrees off boresight. The 3-dB scan loss is generally acceptable, however, the scan loss may be minimized by using well-known techniques. The corresponding beamwidths are about 1 degree for the boresight beam and 1.3 degrees for the beam at 10 degrees off boresight. The outputs of feedhorns 204 may be connected to low-noise amplifiers according to techniques well known in the art.

The tracking mechanism 206 keeps the array of the feedhorns 204 pointed at the geo-stationary satellites 102. By way of example, each of the feedhorns 204 may be slightly re-positioned and pointed independently by well-known mechanical devices such as orthogonal jack screws (not shown). Independently pointing each of the feedhorns 204 ensures continuous correct alignment, but is generally costly to implement. A less expensive approach is to adjust the position of the parabolic reflector 202 relative to the entire array of feedhorns 204 to optimize the overall data throughput for the array of the feedhorns 204. Tracking mechanisms for adjusting the position of the parabolic reflector 202 relative to the entire array of feedhorns 204 are well known in the art, therefore the tracking mechanism 206 is represented in the figure as a simple curved arm connecting the feedhorns 204.

Figure 3:
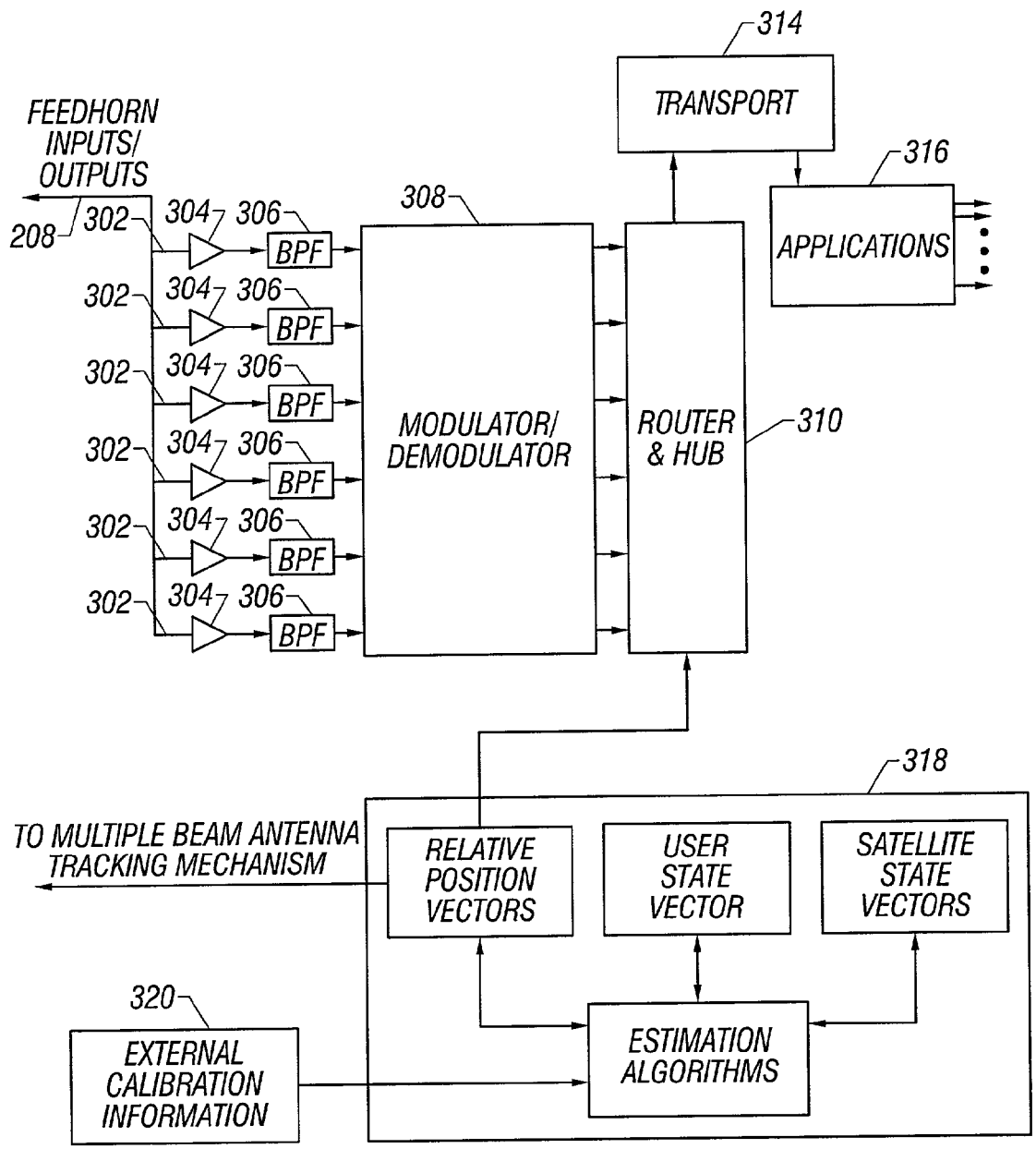
FIG. 3 is a detailed diagram of the user terminal of FIG. 1.

FIG. 3 is a detailed diagram of one of the multiple link user terminals 110 of FIG. 1. Shown in FIG. 3 are received signals 208, amplifer 304, bandpass filters 306, a modulator-demodulator (modem) 308, a router & hub 310, a transport layer 314, applications 316, an estimation processor 318, and external calibration information 320. The description of the multiple link user terminal 110 below applies to the receive mode, and applies reciprocally to the transmit mode.

The amplifiers 304 amplify the received signals 208 corresponding to each of the geo-stationary satellites 102. The bandpass filters 306 remove out-of-band signals from the amplified received signals 208, which are down-converted and filtered again by down-converters (not shown). The modem 308 converts the resulting waveforms into digital information and extracts the data packets from the Ku-band carrier for each of the geo-stationary satellites 102.

The router & hub 310 connects the user network links to the Internet 106 via the wireless communications linkages 105 provided by each of the geo-stationary satellites 102 and shuffles data packets from various wireless linkages 105 connected via the geo-stationary satellites 102 to the Internet. The router & hub 310 performs the "network" layer functions. The number of available communication linkages to the Internet 106 may be dynamic and is generally limited to less than 10. Also, there may be more forward links (terminal in receive mode) than return links (terminal in transmit mode), and some of the wireless communication linkages 105 may be bi-directional while others may be uni-directional. The router & hub 310 includes a routing table that is updated independently for each user terminal 110 by the estimation processor 318. In a geo-stationary satellite system, the routing table content is generally stable. The table dynamics are mainly a result of traffic variations in the user network or Internet and not of changes in communications topology.

The estimation processor 318 inputs the external calibration information 320, updates the routing table in the router 310, and outputs the relative positions of the geo-stationary satellites 102 to the tracking mechanism 206 of the multiple beam antenna (MBA) 200 in FIG. 2 and to the routing table in the router & hub 310. The estimation processor 318 contains relative position vectors for each of the geo-stationary satellites 102, user state vectors, satellite state vectors, and estimation algorithms.

In the transport layer 314, Internet protocol ensures that the data packets are re-arranged in the proper sequence and are presented in the appropriate format to each of the applications 316. TCP/IP protocol is generally constructed in layers of modular protocol software. Each layer is assigned to a task involving the message traffic. For example, one layer for the user terminal 110 in the receive mode decides whether to keep a message or forward it to another application, while another layer must decide which application should receive the message.

Figure 4:
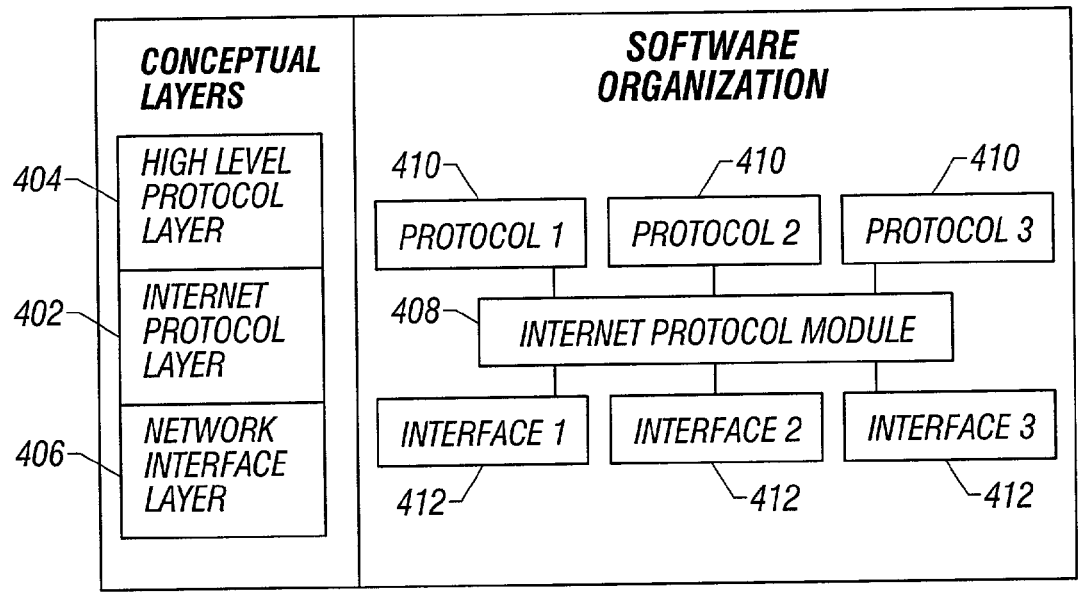
FIG. 4 is a block diagram illustrating the layered software structure of a typical communications network of the prior art based on an Internet protocol (IP)

FIG. 4 is a block diagram illustrating the layered software structure of a typical communications network based on an Internet protocol (IP). On the left side of FIG. 4, the software layers are illustrated conceptually as an Internet protocol layer 402 between an upper high level protocol layer 404 and a lower network interface layer 406. The right side of FIG. 4 illustrates the software organization of the Internet protocol module 408 with respect to multiple high level protocols 410 and multiple network interfaces 412. This open communications architecture is exploited in the user terminal 110 by using a separate wireless communications link 105 for each of the network interfaces 412.

For example, at the delivery end of the network of a service provider such as a digital TV operator or a multimedia content aggregator using TCP/IP, aggregated data streams intended for a specific user are grouped into datagrams, which are the basic data transfer units in TCP/IP Internet. A datagram is divided into a header and a data section. Internet protocol specifies the header format including the source and destination IP address. Internet protocol does not specify the format of the data section, therefore the data section may be used to transport arbitrary data. The length of the datagram is given by the total length field in the header. Currently the total length field is 16 bits long, and may be changed in the future. For a 16-bit field, the maximum total length of the data section is about 64 kilobits.

Instead of designing datagrams that adhere to the constraints of physical networks, TCP/IP software selects a convenient initial datagram size and arranges a way to divide large datagrams into smaller pieces when the datagram has to traverse a network that has a small maximum transfer unit (MTU), i.e., when the datagram length is greater than the maximum length of a block of data that may be transferred over the network. The smaller pieces into which a datagram is divided are called fragments, and the process of dividing a datagram into fragments is known as fragmentation. Fragmentation usually occurs at a router somewhere along the path between the datagram source and its ultimate destination. When the router receives a datagram from a network with a larger maximum transfer unit to send over a network having a smaller maximum transfer unit, the router fragments the datagram. The fragments travel as separate datagrams until they arrive at their ultimate destination, where they have to be re-assembled.

At the destination end, datagrams are re-assembled or defragmented from data fragments received over a number of wireless communications linkages 105. If any fragments have been lost, the datagram cannot be re-assembled. When an initial fragment is received by a user, a re-assembly timer is started. If the timer exceeds a specified time limit before all the fragments have been received, the data fragments are discarded and the datagram is not processed. At a higher layer of the TCP/IP protocol, a re-send signal is initiated for the entire datagram. On the other hand, the datagram would be lost if User Datagram Protocol (UDP) is used. Once a datagram has been fully re-assembled, the data stream may be demultiplexed at three levels.

Figure 5:
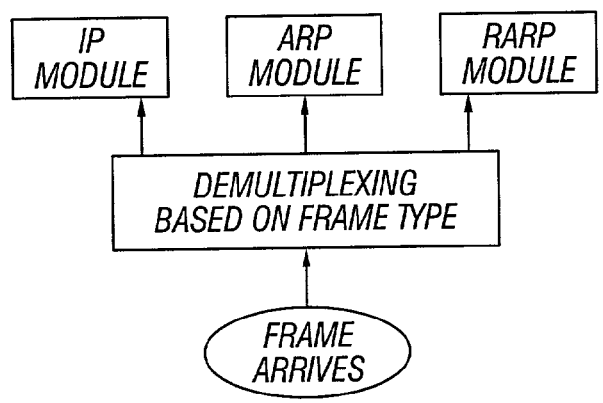
FIG. 5 is a block diagram illustrating demultiplexing of a data stream at the network interface level in FIG. 4.

FIG. 5 is a block diagram illustrating demultiplexing of a stream of data frames at the network interface level 412 in FIG. 4. At the network interface level 412, demultiplexing of the incoming data frames is performed based on the frame type field found in the frame header. The frame content following the frame header may be routed to an Internet protocol (IP) module, an address resolution protocol (ARP) module, or a reversed address resolution protocol (RARP) module. The frame header determines which module receives the incoming data frame.

Figure 6:
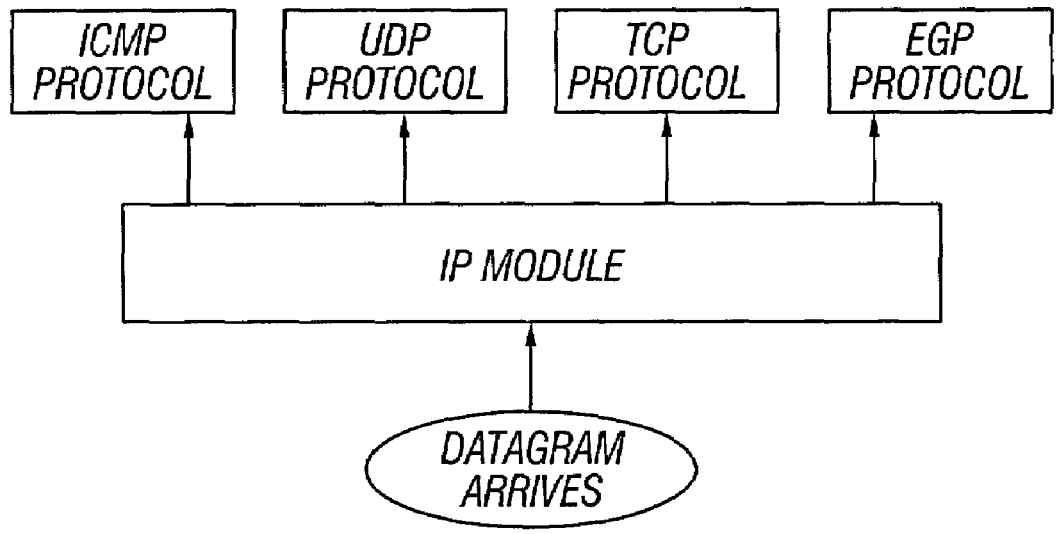
FIG. 6 is a block diagram illustrating demultiplexing at the Internet protocol level in FIG. 4.

FIG. 6 is a block diagram illustrating demultiplexing in the Internet protocol module of FIG. 5. When a datagram arrives, an appropriate process is selected for the datagram based on the protocol type field in the datagram header. The datagram may be classified according to various protocols, for example, TCP (connection oriented), UDP (connectionless oriented), or ICMP (Internet control message protocol). ICMP is used by a router and host to send reports of problems regarding datagrams to the originator, including echo request and reply, and EGP (exterior gateway protocol). EGP is used by a router in one autonomous system to advertise the IP addresses of networks within that autonomous system to a router in another autonomous system.

Figure 7:
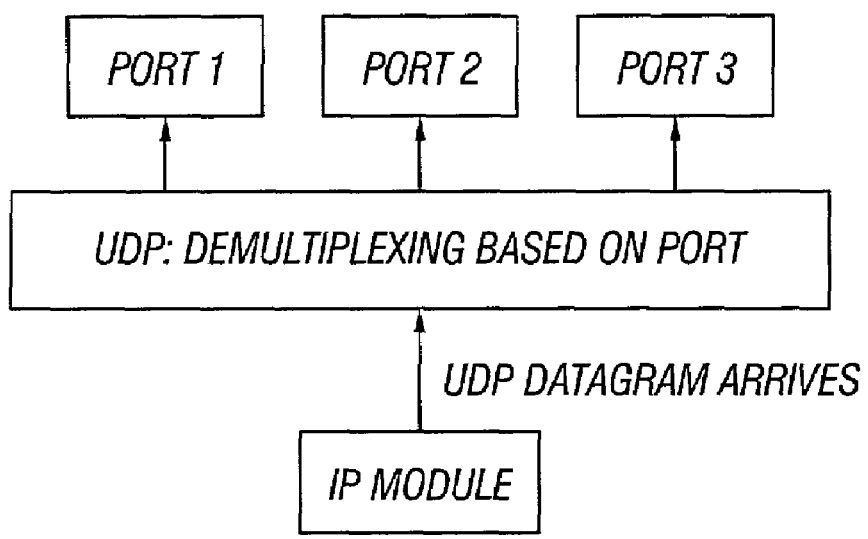
FIG. 7 is a block diagram illustrating demultiplexing at the UDP protocol level in FIG. 6.

FIG. 7 is a block diagram illustrating demultiplexing by the UDP protocol module in FIG. 6. In this example, a UDP destination port number is used to select an appropriate destination port for incoming datagrams. A socket uniquely represents an IP address plus a port number. Connections between two hosts are specified fully by sockets assigned to the datagram originator and the destination. Connections between two sockets are full duplex communication paths between end processes. TCP identifies a connection as a pair of endpoints; UDP uses port numbers. TCP provides reliable datagram delivery service, UDP does not. Each of these protocols is used in various applications.

The user terminal 110 described above may be used for broadband last mile connectivity to connect multiple subscribers to the Internet, advantageously providing multiple wireless connections in a physical layer. The multiple wireless connections support various applications concurrently with robust and dynamic interconnectivity and may be used to increase system capacity limited by satellite slots and available bandwidth. A broad spectrum of digital multimedia services including satellite digital TV systems, such as DirecTV, may be provided using existing satellites while eliminating the single point failure problem presently confronting all satellite systems. By breaking the barrier of capacity limitation, the multiple link user terminal 110 of the present invention enables a multimedia service provider to deliver multi-casting services more effectively.

Other modifications, variations, and arrangements of the present invention may be made in accordance with the above teachings other than as specifically described to practice the invention within the spirit and scope defined by the following claims.

What is claimed is:

1. A method of data transfer comprising the steps of:
   (a) establishing multiple dynamic wireless linkages between a communications network based on an Internet protocol and a user terminal via a plurality of geo stationary satellites, the user terminal coupled to a multiple beam antenna through which the multiple dynamic wireless linkages are established; and
   (b) transferring datagrams conforming to the Internet protocol between the user terminal and the communications network over the multiple wireless linkages, wherein the multiple wireless linkages are coupled to the communications network by RF communications base terminals connected to Internet nodes.

2. The method of claim 1 wherein the communications network is the global Internet.

3. The method of claim 1 wherein the datagrams comprise data frames conforming to the Internet protocol.

4. The method of claim 1 wherein the user terminal assembles datagrams from data frames received as input from the communications network.

5. The method of claim 1 wherein the user terminal fragments datagrams to generate data frames generated as output to the communications network.

6. A communications system comprising:
   a plurality of geo-stationary satellites;
   a communications network based on an Internet protocol;
   a plurality of Internet nodes coupled to the communications network;
   a plurality of communications base terminals coupled to the Internet nodes and to the plurality of geostationary satellites;
   a user terminal coupled to the plurality of geo-stationary satellites, wherein multiple dynamic wireless linkages are established between the user terminal, the plurality of communications base terminals and the communications network based on the Internet protocol; and
   a multiple beam antenna for receiving and transmitting signals between the user terminal and the plurality of geo-stationary satellites.

7. The communications system of claim 6 wherein the user terminal comprises:
   a plurality of amplifiers coupled to the multiple beam antenna;
   a plurality of bandpass filters coupled to the plurality of amplifiers;
   a modem coupled to the plurality of bandpass filters;
   a router & hub coupled to the modem;
   a transport layer coupled to the router & hub; and
   an estimation processor coupled to the hub & router.

8. The communications system of claim 7 wherein the estimation processor comprises:
   a plurality of relative position vectors;
   a user state vector;
   a plurality of satellite state vectors; and
   at least one estimation algorithm module coupled to the plurality of relative position vectors, the user state vector, and the plurality of satellite state vectors.

9. The communications system of claim 7 wherein the estimation processor is coupled to an external calibration information module.

10. The communications system of claim 7 wherein the estimation processor outputs the relative position vectors to the router & hub and to the multiple beam antenna.

11. The communications system of claim 7 wherein the multiple beam antenna comprises a reflector and a plurality of feedhorns coupled to the reflector.

12. The communications system of claim 11 wherein the reflector is a parabolic reflector.

13. The communications system of claim 11 wherein each of the plurality of feedhorns is located on a focal plane of the reflector.

14. The communications system of claim 11 comprising a tracking mechanism coupled to the multiple beam antenna.

15. The communications system of claim 14 wherein the tracking mechanism adjusts a position of each of the plurality of feedhorns independently.

16. The communications system of claim 14 wherein the tracking mechanism adjusts a position of the reflector to optimize overall data throughput.

17. A user terminal comprising:
   a multiple beam antenna for establishing multiple dynamic wireless linkages between the user terminal, a plurality of communications base terminals and a communication network based upon an Internet protocol via a plurality of geostationary satellites;
a plurality of amplifiers coupled to the multiple beam antenna;
a plurality of bandpass filters coupled to the plurality of amplifiers;
a modem coupled to the plurality of bandpass filters;
a router & hub coupled to the modem;
a transport layer coupled to the router & hub; and
an estimation processor coupled to the router & hub.

18. The user terminal of claim 17 wherein the estimation processor comprises:
a plurality of relative position vectors;
a user state vector;
a plurality of satellite state vectors; and
at least one estimation algorithm module coupled to the plurality of relative position vectors, the user state vector, and the plurality of satellite state vectors.

19. The user terminal of claim 17 wherein the estimation processor is coupled to an external calibration information module.

20. The user terminal of claim 17 wherein the estimation processor outputs the relative position vectors to the router & hub and to the multiple beam antenna.

21. The user terminal of claim 17 wherein the multiple beam antenna comprises a reflector and a plurality of feedhorns coupled to the reflector.

22. The user terminal of claim 21 wherein the reflector is a parabolic reflector.

23. The user terminal of claim 21 wherein each of the plurality of feedhorns is located on a focal plane of the reflector.

24. The user terminal of claim 21 comprising a tracking mechanism coupled to the multiple beam antenna.

25. The user terminal of claim 24 wherein the tracking mechanism adjusts a position of each of the plurality of feedhorns independently.

26. The user terminal of claim 24 wherein the tracking mechanism adjusts a position of the reflector to optimize overall data throughput.

* * * * *